United States Patent
Akada et al.

(10) Patent No.: US 6,927,257 B2
(45) Date of Patent: Aug. 9, 2005

(54) RESIN COMPOSITION AND SHEET FOR OPTICAL SCREEN

(75) Inventors: Katsumi Akada, Niihama (JP); Norihiko Ootaka, Tokyo (JP)

(73) Assignees: Sumitomo Chemical Company, Limited, Osaka (JP); Dai Nippon Printing Co., Ltd., Tokyo (JP)

( * ) Notice: Subject to any disclaimer, the term of this patent is extended or adjusted under 35 U.S.C. 154(b) by 118 days.

(21) Appl. No.: 10/466,889

(22) PCT Filed: Jan. 21, 2002

(86) PCT No.: PCT/JP02/00367

§ 371 (c)(1),
(2), (4) Date: Jul. 22, 2003

(87) PCT Pub. No.: WO02/057356

PCT Pub. Date: Jul. 25, 2002

(65) Prior Publication Data

US 2004/0054087 A1 Mar. 18, 2004

(30) Foreign Application Priority Data

Jan. 22, 2001 (JP) ........................................ 2001-013452

(51) Int. Cl.⁷ .......................... C08L 25/14; C08L 33/06; C08L 53/02; G03B 21/62
(52) U.S. Cl. ........................ 525/207; 525/217; 525/221; 525/222; 525/232; 525/238; 525/241; 359/443; 428/515
(58) Field of Search ................................ 525/207, 217, 525/221, 222, 232, 238, 241; 359/443; 428/515

(56) References Cited

U.S. PATENT DOCUMENTS

| 5,408,003 A | * | 4/1995 | Honda et al. ............... 525/227 |
| 5,891,962 A | * | 4/1999 | Otsuzuki et al. ............ 525/316 |
| 6,635,712 B1 | * | 10/2003 | Aoyama et al. ............ 525/191 |

FOREIGN PATENT DOCUMENTS

| EP | 703252 A2 | 3/1996 |
| JP | 4-180948 A | 6/1992 |
| JP | 9-202839 A | 8/1997 |
| JP | 11-147993 A | 6/1999 |
| JP | 2000-66307 A | 3/2000 |
| JP | 2000-297194 A | 10/2000 |
| JP | 2002-30191 A | 1/2002 |

* cited by examiner

*Primary Examiner*—Nathan M. Nutter
(74) *Attorney, Agent, or Firm*—Birch, Stewart, Kolasch & Birch, LLP

(57) ABSTRACT

A resin composition comprising (A) an elastomeric copolymer which comprises styrene monomeric units and diene monomeric units, and (B) a copolymer which comprises styrene monomeric units and (meth)acrylate monomeric units, which has a saturated water absorption of 0.8% or less at a temperature of 60° C. and a relative humidity of 90%, a flexural modulus of at least 1,800 MPa, a notched Izod impact strength of at least 2 kJ/m², a total light transmittance of at least 85% and a haze value of 5% or less when providing a sheet having a thickness of 2 mm, and a Vicat softening point of at least 90° C. This resin composition can suitably be used as a base material of a sheet for a screen which has good transparency, suffers from less deformation such as warp or deflection, and is hardly cracked or chipped.

11 Claims, No Drawings

RESIN COMPOSITION AND SHEET FOR OPTICAL SCREEN

This application is the national phase under 35 U.S.C. § 371 of PCT International Application No. PCT/JP02/00367 which has an International filing date of Jan. 21, 2002, which designated the United States of America.

FIELD OF THE INVENTION

The present invention relates to a resin composition and a sheet for an optical screen comprising the same as a base material.

BACKGROUND ART

An optical screen such as a transmission type screen of a projection television usually comprises a lens sheet such as a Fresnel lens sheet or a lenticular lens sheet. In these years, a front panel may be attached to the surface of such a lens sheet for protecting the lens sheet.

As a base material of such a sheet for an optical screen, an acrylic resin is mainly used from the viewpoint of transparency. For example, JP-A-1-128059 discloses a lens sheet comprising an acrylic resin to which a methyl methacrylate base multilayer rubber is added. JP-A-9-302176 and JP-A-9-302177 disclose a lens sheet comprising a methyl methacrylate-styrene copolymer resin. Furthermore, JP-A-2000-66307 discloses a lens sheet comprising a methyl methacrylate-styrene copolymer resin to which a butadiene base graft rubber is added.

However, the lens sheets disclosed in JP-A-1-128059 and JP-A-2000-66307 have problems such that they tend to warp or deflect when they are used, stored or transported. The lens sheets disclosed in JP-A-9-302176 and JP-A-9-302177 have problems such that they tend to be cracked or chipped when they are processed or installed.

SUMMARY OF THE INVENTION

An object of the present invention is to provide a resin material suitable for use as a base material of a sheet for a screen which has good transparency, suffers from less deformation such as warp or deflection, and is hardly cracked or chipped.

Accordingly, the present invention provides a resin composition comprising (A) an elastomeric copolymer which comprises styrene monomeric units and diene monomeric units, and (B) a copolymer which comprises styrene monomeric units and (meth)acrylate monomeric units, the composition having the following properties (1) to (5):

(1) a saturated water absorption of 0.8% or less at a temperature of 60° C. and a relative humidity of 90%;

(2) a flexural modulus of at least 1,800 MPa;

(3) a notched Izod impact strength of at least 2 $kJ/m^2$;

(4) a total light transmittance of at least 85% and a haze value of 5% or less when providing a sheet with a thickness of 2 mm; and (5) a Vicat softening point of at least 90° C.

Furthermore, the present invention provides a sheet for an optical screen comprising a resin composition of the present invention as a base material.

In addition, the present invention provides a method for producing a screen for an optical screen comprising the step of cutting a sheet comprising a resin composition of the present invention as a base material so as to apply cutting blades to the respective surfaces of the sheet.

Embodiments for Working the Invention

Hereinafter, the present invention will be explained in detail. Herein, the term "(meth)acrylates" is intended to mean esters of acrylic acid and/or esters of methacrylic acid.

The resin composition of the present invention comprises (A) an elastomeric (rubber) copolymer which comprises styrene monomeric units and diene monomeric units, and (B) a copolymer which comprises styrene monomeric units and (meth)acrylate monomeric units, and the particles of the elastomeric copolymer (A) are usually dispersed in a continuous phase of the copolymer (B).

The styrene monomer (monomeric unit) which constitutes the elatomeric copolymer (A) means styrene or a styrene derivative. Examples of the styrene monomer include styrene, alkyl-substituted s tyrenes (e.g. o-methylstyrene, p-methylstyrene, m-methylstyrene, 2,4-dimethylsytrene, p-ethylstyrene, p-tert-butylstyrene, α-methylstyrene, α-methyl-p-methylstyrene, etc.), halogen-substituted styrenes (e.g. o-chlorostyrene, p-chlorostyrene, etc.), and so on. Among them, styrene is preferable. The styrene monomers may be used as a mixture of two or more of them, if desired.

Examples of the diene monomer(monomeric unit) which constitutes the elastomeric copolymer (A) include butadiene, 2-methylbutadiene, 2,3-dimethylbutadiene, etc. Among them, butadiene is preferable. The butadiene monomers may be used as a mixture of two or more of them, if desired.

Besides the styrene monomer and the butadiene monomer, the elastomeric copolymer (A) may optionally comprise other monomer. Examples of such optional monomers include (meth)acrylates (e.g. methyl acrylate, ethyl acrylate, butyl acrylate, cyclohexyl acrylate, phenyl acrylate, benzyl acrylate, 2-ethylhexyl acrylate, 2-hydroxyethyl acrylate, methyl methacrylate, ethyl methacrylate, butyl methacrylate, cyclohexyl methacrylate, phenyl methacrylate, benzyl methacrylate, 2-ethylhexyl methacrylate, 2-hydroxyethyl methacrylate, etc.), unsaturated nitriles (e.g. acrylonitrile, methacrylonitrile, etc.), unsaturated amides (e.g. acrylamide, diacetoneacrylamide, etc.), unsaturated acids (e.g. acrylic acid, methacrylic acid, etc.), unsaturated imides (e.g. phenylmaleimide, cyclohexylmaleimide, etc.), unsaturated acid anhydrides (e.g. maleic anhydride, etc.), and so on.

Examples of the styrene monomer which constitutes the copolymer (B) may be the same as those exemplified for the styrene monomer which constitutes the elastomeric copolymer (A). Among them, styrene is preferable.

Examples of the (meth)acrylate monomer(styrene monomeric unit) which constitutes the copolymer (B) may be the same as those exemplified above. Among them, methyl methacrylate is preferable.

Besides the styrene monomer and the (meth) acrylate monomer, the copolymer (B) may optionally comprise other monomer. Examples of such optional monomers include above-exemplified unsaturated nitriles, unsaturated amides, unsaturated acids, unsaturated imides, unsaturated acid anhydrides, and so on.

The resin composition of the present invention should have a saturated water absorption of 0.8% or less at a temperature of 60° C. and a relative humidity of 90%. When the saturated water absorption exceeds 0.8%, a screen produced from the resin composition tends to greatly warp due to the dimensional change caused by water absorbed, and to cause the deterioration of images due to defocusing. The saturated water absorption is preferably 0.7% or less.

The resin composition of the present invention should have a flexural modulus of at least 1,800 MPa. When the flexural modulus less than 1,800 MPa, a screen produced from the resin composition tends to be deflected and may have insufficient self-supporting properties. The flexural modulus is preferably at least 1,900 MPa.

The resin composition of the present invention should have a notched Izod impact strength of at least 2 $kJ/m^2$. When the notched Izod impact strength is less than 2 $kJ/m^2$, a sheet or a screen produced from the resin composition tends to be easily cracked or chipped when it is processed to produce a screen or the screen is installed. The notched Izod impact strength is preferably at least 2.5 kJ/m$^2$.

Furthermore, when providing a sheet having a thickness of 2 mm, the resin composition of the present invention should have a total light transmittance of at least 85% in the direction of the thickness of the sheet, and a haze value of 5% or less. When the total light transmittance is less than 85%, the luminance of the screen produced from the resin composition may be insufficient. When the haze value exceeds 5%, the face of the screen may lose the clearness.

Finally, the resin composition of the present invention should have a Vicat softening point of at least 90° C. When the Vicat softening point is lower than 90° C., a screen produced from the resin composition tends to be thermally deformed, when a temperature rises relatively high during the storage or transportation of the screen. The Vicat softening point is preferably at least 95° C.

The resin composition, which comprises the elastomeric copolymer (A) and the copolymer (B) and has the desired properties, may be prepared by using the elatomeric copolymer (A), the styrene monomer, the (meth)acrylate monomer and optional other monomer or monomers as the raw materials, and mixing and polymerizing them with suitably adjusting the kinds and amounts of the monomers and polymerization conditions. In the course of the polymerization, the styrene monomer, the (meth)acrylate monomer and the optional other monomer are copolymerized to produce the copolymer (B), while a portion of the styrene monomer, the (meth) acrylate monomer and the optional other monomer may optionally be grafted on the elastomeric copolymer (A).

The elastomeric copolymer (A) preferably comprises 5 to 50% by weight of the styrene monomeric units and 50 to 95% by weight of the diene monomeric units, more preferably 10 to 45% by weight of the styrene monomeric units and 55 to 90% by weight of the diene monomeric units, and most preferably 15 to 40% by weight of the styrene monomeric units and 60 to 85% by weight of the diene monomeric units. As the amount of the diene monomeric units in the elastomeric polymer (A) is increased, the notched Izod impact strength of the resin composition can be increased.

The elastomeric polymer (A) may be a random copolymer or a block copolymer. Among them, the random copolymer is preferable in view of the balance between the total light transmittance of the resin composition and the color of the transmitted light. The elastomeric copolymer may be prepared by solution polymerization or emulsion polymerization. In view of the decrease of the saturated water absorption of the resin composition, the elastomeric copolymer is preferably prepared by solution polymerization.

The amounts of the monomers in the raw materials are such that, each based on the whole monomers, that is, the total weight of the styrene monomer, the (meth)acrylate monomer and the optional other monomer, preferably the styrene monomer is 25 to 65% by weight, the (meth)acrylate monomer is 35 to 75% by weight and the optional other monomer is 0 to 40% by weight, more preferably the styrene monomer is 30 to 60% by weight, the (meth)acrylate monomer is 40 to 70% by weight and the optional other monomer is 0to 30% by weight, and most preferably the styrene monomer is 35 to 55% by weight, the (meth)acrylate monomer is 45 to 65% by weight and the optional other monomer is 0 to 20% by weight. As the amount ratio of the styrene monomer to the total weight of the monomers is increased, the saturated water absorption of the resin composition can be decreased. On the other hand, as the amount ratio of the (meth)acrylate monomer is increased, the Vicat softening point of the resin composition can be heightened. In view of the increase in the total light transmittance and the decrease in the haze value of the resin composition, the amounts of the monomers in the raw materials are preferably adjusted so that there is small difference in the refractive index between the copolymer (B) prepared and the elastomeric copolymer (A).

The proportions of the amount of elastomeric copolymer (A) and the total amount of the monomers in the raw materials are such that, based on the sum of the weights of the elastomeric copolymer (A) and the monomers, preferably the former is 1 to 20% by weight and the latter is 80 to 99% by weight, more preferably the former is 2 to 18% by weight and the latter is 82 to 98% by weight, and most preferably the former is 3 to 15% by weight and the latter is 85 to 97% by weight. As the proportion of the former is increased, the saturated water absorption of the resin composition can be decreased while the notched Izod impact strength can be increased. On the other hand, when the proportion of the latter is increased, the flexural modulus of the resin composition can be increased and the Vicat softening point can be heightened.

To polymerize the mixture of the raw materials, preferably they are partially polymerized by bulk polymerization and then the partially polymerized material is further polymerized by cast polymerization or suspension polymerization as disclosed, for example, in U.S. Pat. No. 4,287,317 (corresponding to JP-B-62-13968), or they are polymerized by continuous bulk polymerization and then the unreacted monomers are removed and recovered.

In each polymerization method, azo compounds or organic peroxides may be used as radical polymerization initiators. In addition, chain transfer agents may be used to control the polymerization rate, the molecular weight, the rubber dispersion state, etc. The raw materials may be mixed all at once, or they may be mixed portion by portion. In the case of the portion-by-portion mixing, for example, the elastomeric copolymer (A) and a portion of the monomers are mixed and partially polymerized, and then the partially polymerized product and the remainder of the monomers are mixed and polymerized.

The resin composition of the present invention has excellent properties and can preferably be used as a material of various resin molded articles. When various resin molded articles are produced using the resin composition of the present invention, the resin composition may contain, if desired, at least one of conventional additives such as heat stabilizers, antioxidants, light stabilizers, UV ray absorbers, colorants, plasticizers, mold release agents, lubricants, light-diffusing agents, etc. These additives may be added when the resin composition is prepared by polymerization. Alternatively, the additives may be added to the resin composition, when it is pelletized.

The resin composition of the present invention can be suitably used as a material of an optical member, in particular, as a base material of a sheet for an optical screen such as a transmission type screen of a projection television. Examples of the sheet for the optical screen include lens sheets such as a Fresnel lens sheet and a lenticular lens sheet, front panels, etc.

The Fresnel lens sheet may be produced by cast molding, or by press molding a sheet as an original sheet, which is produced by cast molding or extrusion molding, to impart the Fresnel lens shape to the sheet, or by curing a UV-curable resin on the surface of a sheet to form a Fresnel lens shape.

The lenticular lens sheet may be produced by extrusion molding or cast molding, or by press molding a sheet as an original sheet to impart the lenticular lens shape to the sheet, or by adhering a film of a UV-curable resin having a lenticular lens shape on its surface to a sheet as an original sheet.

The front panel may be produced by extrusion molding or cast molding, and further providing a surface treatment such as a hard coating or a low-reflection coating to a sheet.

In the production of the sheet for the optical screen such as the Fresnel lens sheet, the lenticular lens sheet or the front panel, the sheet is usually cut to a desired size in the final step. In this case, it is preferable from the viewpoint of productivity and costs to employ a method comprising applying cutting blades to the respective surfaces of the sheet in a direction substantially perpendicular to the surface of the sheet to cut the sheet, that is, a so-called press cutting method. In this method, if the impact strength of the sheet is insufficient, the sheet tends to be cracked or chipped. When a sheet comprising the resin composition with a high notched Izod impact strength of at least 2 kJ/m$^2$ is used according to the present invention, it is less cracked or chipped. From such a viewpoint, the notched Izod impact strength is preferably at least 3 kJ/m$^2$, more preferably at least 4 kJ/m$^2$, and most preferably at least 5 kJ/m$^2$.

In particular, when a Fresnel lens sheet is produced, among the above-described methods, the method comprising curing a UV-curable resin on the surface of a sheet as an original sheet to form a Fresnel lens shape is preferable in view of the productivity and costs. In this case, the thickness of the cured resin layer of the Fresnel lens shape is usually form 100 to 300 nm. In this method, an extra cured resin layer, which extends beyond the periphery of the sheet in the form of a burr, is often formed with a thickness of several millimeters. Such an extra marginal part is preferably removed by press cutting. In this press cutting process, cutting blades are applied to the surface having the cured resin layer of the sheet and also to the opposite surface of the sheet. Since the former surface is usually harder than the latter surface, the cutting is actually carried out with propagating a notch formed on the latter surface toward the former surface. Therefore, such a press cutting process is carried out under conditions under which the sheet is easily cracked or chipped. However, when the sheet comprises the resin composition of the present invention, it is hardly cracked or chipped.

In the case of an optical screen comprising a plurality of sheets, for example, an optical screen consisting of a Fresnel lens sheet, a lenticular lens sheet and a front panel, at lease one of those sheets, preferably, all the sheets are sheets comprising the resin composition of the present invention.

EXAMPLES

Hereinafter, the examples of the present invention are explained, but those examples do not limit the scope of the present invention.

The properties of the resin sheets obtained were measured as follows:

(1) Saturated Water Absorption (%)

A test piece was cut out from a resin sheet having a thickness of 2 mm and vacuum dried at 80° C. overnight, and then the dried test piece was weighed. This weight is referred to as "dry test piece weight". Then, the dried test piece was placed in a thermo-hygrostat apparatus maintained at 60° C. and 90% RH until the weight became constant. This constant weight reached is referred to as "water-saturated test piece weight".

From the dry test piece weight and the water-saturated test piece weight, a saturated water absorption was calculated according to the following equation:

Saturated water absorption (%)=100×[(water-saturated test piece weight)−(dry test piece weight)]/(dry test piece weight)

(2) Flexural Modulus (MPa)

A test piece cut out from a resin sheet having a thickness of 2 mm, and a flexural modulus was measured according to JIS K 7203 (1995).

(3) Notched Izod Impact Strength (KJ/m$^2$)

A test piece cut out from a resin sheet having a thickness of 2 mm, and a notched Izod impact strength was measured according to JIS K 7110 (1999).

(4) Total Light Transmittance (%) and haze value (%)

A test piece cut out from a resin sheet having a thickness of 2 mm, a total light transmittance and a haze value were measured according to JIS K 7105 (1981).

(5) Vicat Softening Point (° C.)

A test piece cut out from a resin sheet having a thickness of 2 mm, a Vicat softening point was measured according to JIS K 7206 (1991).

(I) Warp

A test sample of 20 cm×30 cm was cut out from a resin sheet having a thickness of 2 mm, and an aluminum foil was adhered to one surface of the sample with an adhesive. Then, the sample with the aluminum foil was placed in a thermo-hygrostat apparatus maintained at 60° C. and 90% RH(relative humidity) for 24 hours. Then, the degree of warping of the sample was visually evaluated.

(II) Deflection

A test sample of 20 cm×30 cm was cut out from a resin sheet having a thickness of 1 mm and was placed and fixed vertically with the side of 20 cm as a base. Then, the degree of deflection of the sample was visually evaluated.

(III) Cracking and Chipping

A test sample of 20 cm×30 cm was cut out from a resin sheet having a thickness of 2 mm, and a nick was formed with an acryl cutter in parallel with the direction of the 20 cm side. Then, the sample was broken with hands along the nick, and the presence of cracking or chipping on the broken face was visually inspected.

(IV) Clearness of Image

A test sample of 20 cm×30 cm was cut out from a resin sheet having a thickness of 2 mm and attached on the front face of the screen of a projection television. Then, the degree of clearness of an image projected on the screen was visually judged.

(V) Thermal Deformation

A test sample of 20 cm×30 cm was cut out from a resin sheet having a thickness of 2 mm and maintained at 80° C. for one week. Then, the deformation of the sample was visually inspected.

As an elastomeric copolymer, the following copolymers were used:

(a) Styrene-butadiene random copolymer (styrene:butadiene=25:75 by weight) (TUFDENE L 208 A available from Japan Elastomer Company)

(b) Styrene-butadiene block copolymer (styrene:butadiene=40:60 by weight) (NS 312S available from ZEON CORPORATION.)

(c) Butadiene rubber (ASAPRENE 730 AS available from Japan Elastomer Company)

(d) Styrene-butadiene random copolymer (styrene:butadiene=20:80 by weight) (NS 218 S available from ZEON CORPORATION.)

Examples 1–3 And Comparative Examples 1–4

Elastomeric copolymers, monomers and polymerization initiators shown in Table 1 were mixed in amounts shown in Table 1 and then partially polymerized with a two-stage agitation type continuous reactor at 150° C. at a predetermined residence time (360 seconds in Examples 1–3 and Comparative Examples 1 and 4; 225 seconds in Comparative Examples 2 and 3).

To the partially polymerized products (85 parts by weight), monomers shown in Table 2 in amounts shown in Table 2, 0.1 part by weight of 2,2'-azobis(2,4-dimethylvalleronitrile) as a polymerization initiator, 0.3 part by weight of tert-amyl peroxy2-ethylhexanoate as a polymerization initiator and 0.1 part by weight of tert-dodecylmercaptan as a chain transfer agent were added. The mixture was charged in each of two cells, which were constructed with a pair of glass plates and a gasket with a gap distance of 1 mm and 2 mm, respectively, and heated in a water bath kept at 80° C. for 3 hours and then in an air oven kept at 120° C. for 1 hour to complete the polymerization. Thereby, resin sheets respectively having thicknesses of 1 mm and 2 mm were obtained.

A weight ratio of the elastomeric copolymer and the monomers (styrene and methyl methacrylate) and a weight ratio of styrene to methyl methacrylate in total are shown in Table 2.

The properties of the resin sheet having a thickness of 2 mm are summarized in Table 3, while the results of the evaluations of the resin sheet having a thickness of 1 mm or 2 mm are summarized in Table 4.

Comparative Example 5

A styrene-methyl methacrylate copolymer (a weight ratio of styrene to methyl methacrylate=40:60) (MS 600 available from Nippon Steel Chemical Co., Ltd.) was molded with an extrusion molding machine to obtain resin sheets respectively having thicknesses of 1 mm and 2 mm. The properties of the resin sheet having a thickness of 2 mm are summarized in Table 3, while the results of the evaluations of the resin sheet having a thickness of 1 mm or 2 mm are summarized in Table 4.

TABLE 1

| Example No. | Elastomeric copolymer Kind | Elastomeric copolymer PBW | Monomer Styrene (parts by weight) | Monomer Methyl methacrylate (parts by weight) | Polymerization initiator Benzyl peroxide (parts by weight) | Polymerization initiator Lauryl peroxide (parts by weight) |
|---|---|---|---|---|---|---|
| Ex. 1 | (a) | 5.0 | 36.1 | 58.9 | 0.016 | 0.131 |
| Ex. 2 | (a) | 5.0 | 36.1 | 58.9 | 0.016 | 0.131 |
| Ex. 3 | (b) | 5.0 | 52.2 | 42.8 | — | 0.362 |
| C. Ex. 1 | (a) | 5.0 | 36.1 | 58.9 | 0.016 | 0.131 |
| C. Ex. 2 | (c) | 5.0 | 11.4 | 83.6 | — | 0.302 |
| C. Ex. 3 | (d) | 8.0 | 27.6 | 64.4 | — | 0.302 |
| C. Ex. 4 | (b) | 5.0 | 52.2 | 42.8 | — | 0.362 |

TABLE 2

| Example No. | Partially polymerized product (parts by weight) | Monomer Styrene (parts by weight) | Monomer Methyl methacrylate (parts by weight) | Raw material ratio Ratio of elastomeric copolymer to monomers (by weight) | Raw material ratio Ratio of styrene to methyl methacrylate (by weight) |
|---|---|---|---|---|---|
| Ex. 1 | 85 | 10.0 | 10.0 | 4.0/96.0 | 40.4/59.6 |
| Ex. 2 | 85 | 13.0 | 7.0 | 4.0/96.0 | 43.4/56.6 |
| Ex. 3 | 85 | 5.0 | 15.0 | 4.0/96.0 | 49.0/51.0 |
| C. Ex. 1 | 85 | 15.0 | 5.0 | 4.0/96.0 | 45.3/54.7 |
| C. Ex. 2 | 85 | 13.5 | 6.5 | 4.0/96.0 | 23.0/77.0 |
| C. Ex. 3 | 85 | 16.0 | 4.0 | 6.5/93.5 | 40.2/59.8 |
| C. Ex. 4 | 85 | 11.0 | 9.0 | 4.0/96.0 | 55.0/45.0 |

TABLE 3

| Example No. | Saturated water absorbance (%) | Flexural modulus (MPa) | Izod impact strength (kJ/m$^2$) | Total light transmittance (%) | Haze value (%) | Vicat softening point (° C.) |
|---|---|---|---|---|---|---|
| Ex. 1 | 0.67 | 2870 | 3.3 | 91.0 | 0.8 | 102.0 |
| Ex. 2 | 0.63 | 2790 | 5.7 | 91.2 | 1.5 | 103.7 |
| Ex. 3 | 0.45 | 2850 | 4.0 | 90.7 | 2.3 | 94.0 |
| C. Ex. 1 | 0.62 | 2760 | 3.1 | 90.5 | 7.0 | 97.1 |
| C. Ex. 2 | 0.93 | 2080 | 7.4 | 91.4 | 3.5 | 106.6 |
| C. Ex. 3 | 0.67 | 1790 | 9.2 | 91.1 | 4.2 | 103.3 |
| C. Ex. 4 | 0.42 | 3120 | 4.1 | 89.8 | 20.2 | 89.0 |
| C. Ex. 5 | 0.77 | 3300 | 1.6 | 92.0 | 0.3 | 103.0 |

TABLE 4

| Example No. | Warp | Deflection | Cracking/chipping | Clearness of image | Thermal deformation |
|---|---|---|---|---|---|
| Ex. 1 | Small | Small | No | Good | No |
| Ex. 2 | Small | Small | No | Good | No |
| Ex. 3 | Small | Small | No | Good | No |
| C. Ex. 1 | Small | Small | No | Poor | No |
| C. Ex. 2 | Large | Small | No | Good | No |
| C. Ex. 3 | Small | Large | No | Good | No |
| C. Ex. 4 | Small | Small | No | Poor | Yes |
| C. Ex. 5 | Small | Small | Yes | Good | No |

Example 4

To 85 parts by weight of a partially polymerized product prepared in the same manner as in Example 1, were added 10 parts by weight of styrene, 10 parts by weight of methyl methacrylate, 0.1 part by weight of 70 wt. % tert-butyl peroxypivalate (a polymerization initiator), 0.3 part by weight of tert-amyl peroxy2-ethylhexanoate (a polymerization initiator) and 0.1 part by weight of tert-dodecylmercaptan (a chain transfer agent). The mixture was charged in each of two cells, which were constructed with a pair of glass plates and a gasket with a gap distance of 1.8 mm and 2 mm, respectively, and heated in an air oven at 70° C. for 8 hours, then at 75° C. for 2 hours, and further at 120° C. for 1 hour to complete the polymerization. Thereby, resin sheets respectively having thicknesses of 1.8 mm and 2 mm were obtained.

The physical properties of the resin sheet having a thickness of 2 mm were measured. The saturated water absorption was 0.6%, the flexural modulus was 2770 MPa, the notched Izod impact strength was 7.0 kJ/m$^2$, the total light transmittance was 91%, the haze value was 0.3%, and the Vicat softening point was 104° C.

A UV-curable resin was charged between the resin sheet having a thickness of 1.8 mm and a mold having a Fresnel lens shape, and cured by irradiation of UV-ray to form a Fresnel lens layer having a thickness of 100 to 300 μm on the surface of the resin sheet. This sheet was cut by applying cutting blades from the both sides in a direction substantially perpendicular to the surface. As a result, neither cracking nor chipping was found.

Comparative Example 6

A styrene-methyl methacrylate copolymer (a weight ratio of styrene to methyl methacrylate=40:60) (MS 600 available from Nippon Steel Chemical Co., Ltd.) was molded with an extrusion molding machine to obtain a resin sheet having a thickness of 1.8 mm.

A UV-curable resin was charged between this resin sheet and a mold having a Fresnel lens shape, and cured by irradiation of UV-ray to form a Fresnel lens layer having a thickness of 100 to 300 μm on the surface of the resin sheet. This sheet was cut by applying cutting blades from the both sides in a direction substantially perpendicular to the surface. As a result, many crackings and chippings were found.

Effects of the Invention

The resin composition of the present invention can suitably be used as a base material of a sheet for a screen which has good transparency, suffers from less deformation such as warp or deflection, and is hardly cracked or chipped.

What is claimed is:

1. A resin composition obtained by copolymerizing a composition comprising (A) an elastomeric copolymer which comprises styrene monomeric units and diene monomeric units, and (B) a copolymer which comprises styrene monomeric units and (meth)acrylate monomeric units, the resin compostion having the following properties (1) to (5):

(1) a saturated water absorption of 0.8 % or less at a temperature of 60° C. and a relative humidity of 90%;
   (2) a flexural modulus of at least 1,800 MPa;
   (3) a notched Izod impact strength of at least 2 kJ/m$^2$;
   (4) a total light transmittance of at least 85% and a haze value of 5% or less when providing a sheet with a thickness of 2 mm; and
   (5) a Vicat softening point of at least 90° C.

2. The resin composition according to claim 1, wherein the saturated water absorption is 0.7% or less.

3. The resin composition according to claim 1, wherein the flexural modulus is at least 1900 MPa.

4. The resin composition according to claim 1, wherein the notched Izod impact strength is at least 2.5 kJ/m$^2$.

5. The resin composition according to claim 1, wherein the Vicat softening point is at least 95° C.

6. An optical screen comprising a resin composition according to any one of claims 1 to 5 as a base material.

7. A method for producing a sheet for an optical screen comprising the step of cutting a sheet which comprises a resin composition according to any one of claims 1 to 5 as a base material so as to apply cutting blades to the respective surfaces of the sheet.

8. The resin composition according to any one of claims 1 to 5, which is obtained by partially polymerizing a composition containing (A) an elastomeric copolymer which comprises styrene monomeric units and diene monomeric units, a styrene monomer, a (meth)acrylate monomer and optional other monomer by bulk polymerization, and further polymerizing the monomers by cast polymerization or suspension polymerization.

9. The resin composition according to any one of claims 1 to 5, wherein the amount of the elastomeric copolymer (A) is from 1 to 20% by weight based on the weight of the resin composition, and the amounts of the styrene monomer, the (meth)acrylate monomer and optional other monomer are 25 to 65% by weight, 35 to 75% by weight and 0 to 40% by weight respectively, based on the total weight of the monomers.

10. The resin composition according to claim 1, wherein the elastomeric copolymer (A) is an elastomeric copolymer prepared by solution polymerization.

11. The resin composition according to claim 1, wherein the elastomeric copolymer (A) is a random copolymer.

* * * * *